United States Patent
Sugitatsu

(10) Patent No.: US 8,206,487 B2
(45) Date of Patent: Jun. 26, 2012

(54) METHOD FOR PRODUCING CARBON COMPOSITE METAL OXIDE BRIQUETTES

(75) Inventor: Hiroshi Sugitatsu, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 226 days.

(21) Appl. No.: 12/670,741

(22) PCT Filed: Jul. 25, 2008

(86) PCT No.: PCT/JP2008/063410
§ 371 (c)(1),
(2), (4) Date: Jan. 26, 2010

(87) PCT Pub. No.: WO2009/017059
PCT Pub. Date: Feb. 5, 2009

(65) Prior Publication Data
US 2010/0187713 A1 Jul. 29, 2010

(30) Foreign Application Priority Data
Jul. 27, 2007 (JP) ................................ 2007-196399

(51) Int. Cl.
C22B 1/24 (2006.01)
C22B 1/245 (2006.01)
(52) U.S. Cl. ............. 75/771; 75/770; 264/109; 264/122
(58) Field of Classification Search .................. None
See application file for complete search history.

(56) References Cited

U.S. PATENT DOCUMENTS

| 4,093,425 A | 6/1978 | Araki et al. |
| 4,659,374 A * | 4/1987 | Alanko et al. .................. 75/766 |
| 6,120,577 A * | 9/2000 | Koros et al. ..................... 75/483 |
| 6,802,886 B2 * | 10/2004 | Hoffman et al. ................ 75/484 |
| 7,938,883 B2 * | 5/2011 | Negami et al. .................. 75/484 |
| 2002/0175441 A1 * | 11/2002 | Tsuchiya et al. ............. 264/118 |
| 2004/0020326 A1 * | 2/2004 | Ibaraki et al. ................... 75/313 |
| 2006/0105901 A1 * | 5/2006 | Stein et al. ..................... 501/109 |
| 2006/0278040 A1 * | 12/2006 | Harada et al. .................. 75/479 |

FOREIGN PATENT DOCUMENTS

| JP | 54-13441 | 5/1979 |
| JP | 62-158812 | 7/1987 |
| JP | 7-157827 | 6/1995 |
| JP | 7-224330 | 8/1995 |
| JP | 8-40565 | 2/1996 |

(Continued)

OTHER PUBLICATIONS

U.S. Appl. No. 12/602,125, filed Nov. 27, 2009, Harada, et al.

*Primary Examiner* — Mary F Theisen
(74) *Attorney, Agent, or Firm* — Oblon, Spivak, McClelland, Maier & Neustadt, L.L.P.

(57) ABSTRACT

A method for producing carbon composite metal oxide briquettes includes a mixing step of adding a binder to a metal oxide raw material and a carbonaceous material and mixing the metal oxide raw material, the carbonaceous material, and the binder by a mixer to prepare a powder mixture, and a forming step of forming the powder mixture into carbon composite metal oxide briquettes by using a briquetting machine, in which, in the mixing step, a batch mixer is used as the mixer.

13 Claims, 2 Drawing Sheets

FOREIGN PATENT DOCUMENTS

| | | |
|---|---|---|
| JP | 9-192896 | 7/1997 |
| JP | 10-158714 | 6/1998 |
| JP | 11-83604 | 3/1999 |
| JP | 11-310832 | 11/1999 |
| JP | 2001-348625 | 12/2001 |
| JP | 2002-235122 | 8/2002 |
| JP | 2003-89823 | 3/2003 |
| JP | 2004-76148 | 3/2004 |
| JP | 2004-269978 | 9/2004 |
| JP | 2006-265617 | 10/2006 |
| JP | 2007-113086 | 5/2007 |

* cited by examiner

Prior Art

METHOD FOR PRODUCING CARBON COMPOSITE METAL OXIDE BRIQUETTES

TECHNICAL FIELD

The present invention relates to a method for producing carbon composite metal oxide briquettes, including mixing an metal oxide raw material, a carbonaceous material, and a binder by a mixer and press-forming the resulting mixture by a briquetting machine.

BACKGROUND ART

As methods for producing reduced iron, there are methods that use natural gas as a reductant and methods that use coal as a reductant. Methods that use coal have drawn much attention recently since coal is less expensive than natural gas and the geographical restriction for plant locations is less severe than the methods that use natural gas.

Regarding the methods that use coal, many proposals of methods for producing reduced iron have been made in which carbon composite metal oxide agglomerates made from a powder mixture of iron ore (metal oxide raw material) and coal (carbonaceous reductant, also referred to as "carbonaceous material" hereinafter) are charged into a rotary hearth furnace, heated, and reduced (e.g., refer to Patent Documents 1 and 2).

Examples of the methods for agglomerating a powder mixture of iron ore and coal include a method for producing spherical pellets by tumbling agglomeration using a pelletizer, a method for forming cylindrical pellets by mechanical extrusion, and a method for forming briquettes by pressing with a briquetting roll.

The method for forming pellets by tumbling agglomeration requires a large quantity of water during pelletization and thus the pellets must be dried after the agglomeration. Thus, this method has a problem in that a large heat quantity is required for drying water in the pellets (e.g., refer to Patent Document 3).

The method for forming pellets by extrusion uses fluidized raw materials; thus, a larger quantity of water is necessary during pelletization than in the case of the tumbling agglomeration described above. Moreover, the pellets must be dried after the pelletization. Thus, there is a problem in that a larger heat quantity is required for drying water in the pellets compared to the tumbling agglomeration method described above.

In contrast, in the briquetting method that uses briquetting rolls, liquid binders such as molasses (including blackstrap molasses, the same applies in the description below), lignin, and the like can be used. Thus, according to this method, dry raw materials can be agglomerated without adding water. The briquettes formed thereby do not have to be dried. Thus, there is an advantage that the heat quantity required for drying water in the agglomerates can be reduced compared to the pelletization method described above (e.g., refer to Patent Document 4).

Meanwhile, mixers used in steel industry, in particular, in iron-making processes, are large-sized to increase the throughput; thus, continuous systems are often employed to reduce the equipment cost. For example, conventional raw materials such as raw materials of sinter plants are prepared by mixing a large quantity of iron ore and a small quantity of an additive having a different property, e.g., 0.5 to 3 wt % of quick lime (for example, refer to Patent Document 8). In contrast, according to a method for producing reduced iron by heating and reducing carbon composite metal oxides in a rotary hearth furnace, as much as 30% or more of coal having a different property from iron ore is blended with iron ore (e.g., refer to Patent Document 1). In general, coal has water repellency and the bulk specific gravity of pulverized coal is smaller than that of iron ore, e.g., sometimes not more than a half that of the iron ore; thus, the volume of the coal is sometimes larger than the volume of the iron ore during mixing. The inventors of the present invention have found that conventional continuous mixers sometimes fail to achieve sufficient mixing since a large quantity of a substance having a different property is mixed with iron ore.

Moreover, this method for producing reduced iron is applicable to recycling of metal oxide-containing substances, for example, by-products such as dust generated during iron-making processes. In such a case, the raw material mixing ratio is, for example, 60 wt % converter furnace dust, 25 wt % rolling scale, and 15 wt % anthracite as a carbonaceous material in the case described in Patent Document 3, and mixing is more difficult in such a case.

In particular, when continuous mixers are used, the mixing ratio may vary when the feed rates of these powder raw materials unintentionally change over time. It has been found that this leads to problems such as insufficient reduction resulting from lack of a sufficient amount of carbon in the agglomerates required for reduction reaction in rotary hearth furnaces and insufficient strength after reduction caused by excessive amounts of carbon.

The conventional continuous methods described above are described in, for example, Patent Document 5. FIG. 2 shows one example of a conventional continuous method. Particular amounts of powders respectively stored in storage bins 21 to 24 are fed to a powder conveyor 29 so as to achieve a particular ratio. Examples of continuous constant feeding devices 25 to 28 used here include belt-conveyor-type weighing feeders and loss-in-weight feeders. The powders fed from the storage bins 21 to 24 are transferred by the powder conveyor 29 and mixed and crushed by a powder crusher/mixer device 30 such as a ball mill. Then the crushed and mixed powders are sent to a pan pelletizer 32 by a crushed material conveyor 31. In the pan pelletizer 32, the powders having water contents controlled to 8 to 13 mass % are tumbled on a wok-shaped rotary pan having a diameter of 3 to 6 m to produce spherical green pellets. Also disclosed is a method for forming compacts by using a mixer equipped with a roller having a plurality of recessed molding forms inside of which the briquettes are formed. In order to maintain the strength of the compacts, binders are usually used. A solid binder is stored in a storage bin and fed by a continuous constant feeder. A liquid binder is added into the powder crusher/mixer device 30 through a liquid feed line 33. Liquids other than binders, such as water and slurry-like raw materials (slurry containing metal oxide or carbonaceous materials), are also added in the same manner as the liquid binder.

Belt-conveyor-type continuous constant feeders measure the load on the belt and the belt speed to determine the feed rate, and the amount of feed is controlled by controlling the belt speed. This measurement method is highly accurate; however, once physical properties, such as the water content and the bulk specific gravity of the powders, vary, the feed rate changes temporarily and it takes some time before the feed rate returns to a set point and stabilizes. Loss-in-weight feeders feed the powder by a screw feeder or a table feeder while constantly measuring the weight of the powder stored in a gravimetric hopper and control the feed rate on the basis of the loss in weight. Thus, highly accurate measurement can be carried out as with the belt conveyor-type feeders. However, the feed rate also temporarily changes when physical properties, such as water content and bulk specific gravity of the powders, vary. Moreover, when the powder in the scale hopper runs low, the powder is supplemented from the storage bin disposed above, and during this operation the loss in weight cannot be measured. Thus, it has been found that there is a problem in that the feed rate can temporarily change during this operation.

It has been known that when briquettes are made from a mixture prepared by charging a liquid binder, such as molasses or lignin, and powder raw materials (iron ore and coal) into a mixer simultaneously and continuously as has been practiced widely, the strength of the briquettes varies. This is attributable to the following reason. A liquid binder is highly viscous and is thus likely to be distributed unevenly in the powder mixture. The liquid binder forms lumps in portions where the amount of the liquid binder is excessive and does not exhibit a binder function in portions where the amount of liquid binder is too small. Accordingly, the briquettes including these portions exhibit lower strength than briquettes free of portions where the binder is unevenly distributed.

In order to overcome the variation in strength of briquettes, improvements have been attempted such as changing the position where the liquid binder is fed to the continuous mixer; however, when the mixing state of the powder raw materials changes, the liquid binder just flows and glides over the surface of the powder raw materials or remains in one position. Therefore, it has been extremely difficult to stably achieve a desirable dispersion state. Furthermore, it has been found that because powder raw materials and liquid binders are fed continuously, instantaneous values of the respective feed rates vary easily, the mixing ratio of the liquid binder to the powder raw materials varies easily, and variation in strength of the briquettes still occurs.

In order to overcome the variation in strength of the briquettes, Patent Documents 6 to 8 propose methods involving diluting molasses, i.e., a type of a highly viscous liquid binder, with water to decrease its viscosity before adding the molasses to powder raw materials. However, because resultant briquettes contain large quantities of water, the briquettes must be dried after the pelletization as in the pelletizing methods described above. This leads to a problem in that a large heat quantity is required for drying water in the briquettes.

Although the field of application is different, Patent Document 9 discloses a method for stably controlling the feed rate of molasses, i.e., a highly viscous liquid binder, regardless of the temperature changes. In order to quantitatively control the flow rate of molasses despite temperature changes, a recovery tank is provided in addition to a feed tank and the flow rate is adjusted by an inverter-controlled gear pump before the valve is switched from the recovery tank to the mixer. Although a highly viscous liquid binder can be fed highly accurately by this feed method, a recovery tank, a load cell, an inverter, and controllers for controlling these components are needed, which disadvantageously increases the cost and the size of the installation site.

Patent Document 10 discloses a method involving mixing plastic waste serving as a binder with powder raw materials using a batch mixer. However, this method works on the assumption that plastic waste is reused, and the technical idea thereof is to simultaneously feed powder raw materials and thermoplastic plastic waste into a batch mixer and to soften the thermoplastic plastic waste under heating and mixing so as to cause the thermoplastic plastic waste to exhibit a binder function. Thus, the technical idea is completely different from that of the present invention described below.

[Patent Document 1] Japanese Unexamined Patent Application Publication No. 2004-269978
[Patent Document 2] Japanese Unexamined Patent Application Publication No. 9-192896
[Patent Document 3] Japanese Unexamined Patent Application Publication No. 2001-348625
[Patent Document 4] Japanese Unexamined Patent Application Publication No. 11-310832
[Patent Document 5] Japanese Unexamined Patent Application Publication No. 2003-89823
[Patent Document 6] Japanese Unexamined Patent Application Publication No. 7-157827
[Patent Document 7] Japanese Unexamined Patent Application Publication No. 7-224330
[Patent Document 8] Japanese Unexamined Patent Application Publication No. 2007-113086
[Patent Document 9] Japanese Unexamined Patent Application Publication No. 11-83604
[Patent Document 10] Japanese Unexamined Patent Application Publication No. 2002-235122

DISCLOSURE OF INVENTION

An object of the present invention is to provide a method for producing carbon composite metal oxide briquettes having a stable strength.

An aspect of the present invention provides a method for producing carbon composite metal oxide briquettes, the method including a mixing step of adding a binder to a metal oxide raw material and a carbonaceous material and mixing the metal oxide raw material, the carbonaceous material, and the binder by a mixer to prepare a powder mixture, and a forming step of press-forming the powder mixture into carbon composite metal oxide briquettes by using a briquetting machine, in which, in the mixing step, a batch mixer is used as the mixer.

Further objects, features, aspects, and advantages of the present invention will become readily apparent from the following detailed description and accompanying drawings.

BEST MODES FOR CARRYING OUT THE INVENTION

Embodiments of the present invention will now be described in detail with reference to the drawings.

Figure 1:
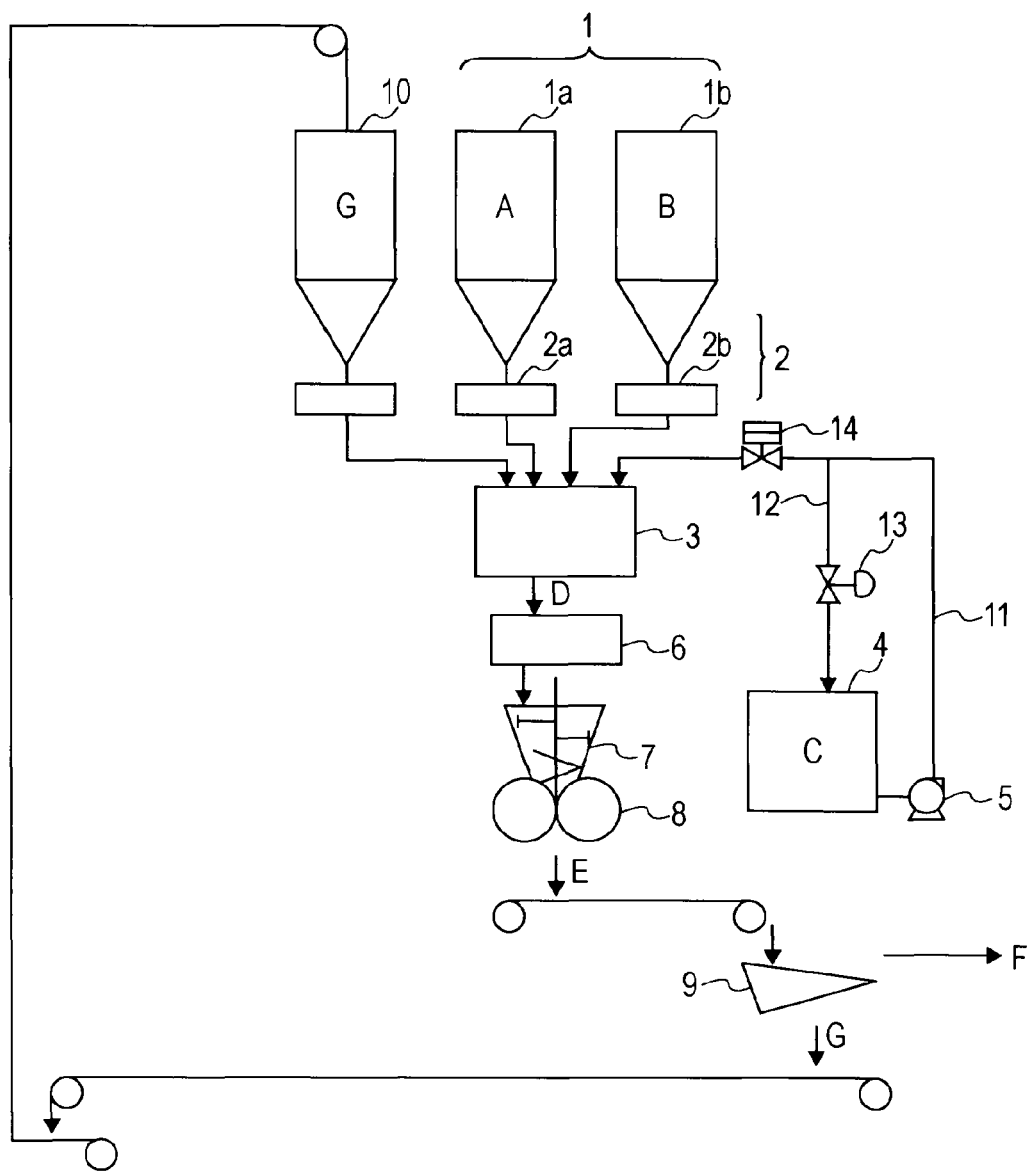
FIG. 1 is a diagram schematically showing a flow for producing carbon composite metal oxide briquettes according to an embodiment of the present invention.
Figure 2:
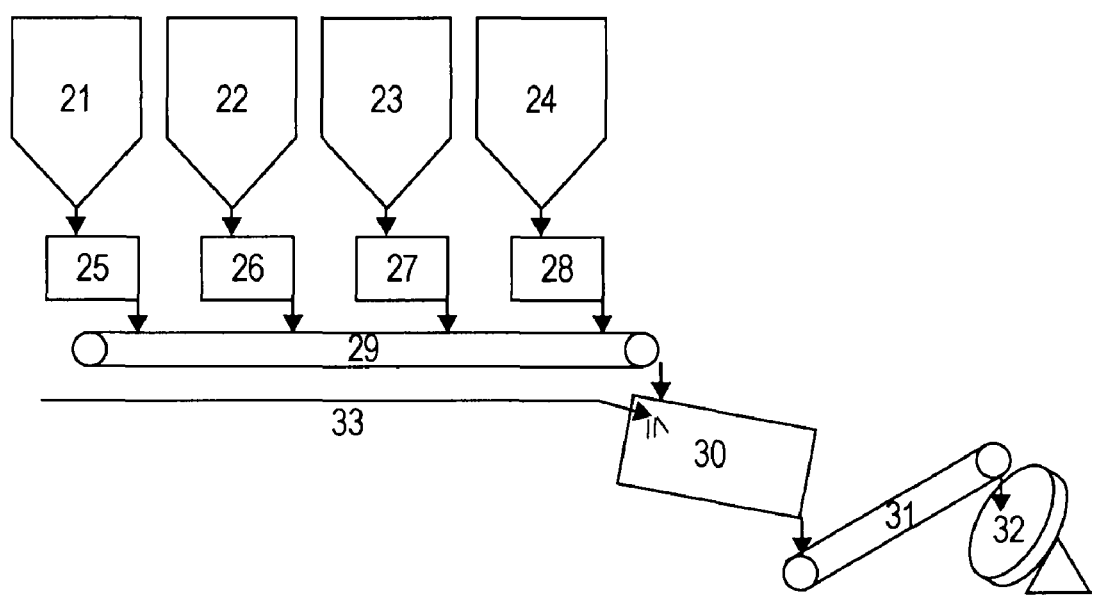
FIG. 2 is a diagram showing a continuous method for producing compacts according to related art.

FIG. 1 is a diagram schematically showing a flow for producing carbon composite metal oxide briquettes according to an embodiment of the present invention. A method for producing carbon composite metal oxide briquettes according to the embodiment of the present invention includes a mixing step of charging a metal oxide raw material, a carbonaceous material, and a highly viscous liquid binder into a batch mixer and mixing the metal oxide raw material, the carbonaceous material, and the highly viscous liquid binder by the mixer to prepare a powder mixture, and a forming step of press-forming the powder mixture into carbon composite metal oxide briquettes by a briquetting machine. The respective steps will now be described.

(Mixing Step)

First, predetermined amounts of iron ore A as a metal oxide raw material and pulverized coal B as a carbonaceous material respectively from stock bins 1 (1a and 1b) are weighed by respective scale hoppers 2 (2a and 2b) and charging into a batch mixer (simply referred to as "mixer" hereinafter) 3 is started. A batch mixer is a type of a mixer in which raw materials are fed, stirred and mixed, and discharged each time operation is conducted. Feeding from the scale hoppers 2 may be conducted by screw feeders, table feeders, rotary valves, and the like. An arrangement should be made to place a raw material in an amount slightly larger than the amount required for one batch in each scale hopper 2 and to stop feeding when the total amount of feed reaches the amount required for one batch. According to this arrangement, even when the feed rate varies during feeding, the amount supplied to the mixer 3 during one batch remains unaffected. These powder raw materials do not have to be fed onto a powder conveyor and are preferably directly fed to the mixer 3. However, a conveyor may be used if a layout requires it. Examples of the mixer 3 that can be used include mix muller mixers, ploughshare mixers, Lodige mixers, paddle mixers, ribbon mixers, Eirich mixers, and rotary ball mills. The charging operation is continued for a predetermined length of time. After at least part of the powder raw materials (the iron ore A and carbonaceous material B) is fed, feeding of a binder is started so that the binder is added into the mixer 3 already containing at least part of the powder raw materials. The binder may be solid or liquid. Here, an example in which molasses C, i.e., a highly viscous liquid binder (simply referred to as "liquid binder" hereinafter), is used is described. The molasses C is fed from a liquid binder tank 4 through a pump 5. A diaphragm pump, a gear pump, a centrifugal pump, or the like can be used as the pump 5. In the description above, "at least part" means "part" or "all". However, from the viewpoint of suppressing an increase in equipment size, it is preferable to start adding molasses C before all powder raw materials are charged. In this case, it is preferable to continue charging of the remaining of the powder raw materials even after inception of the feeding of the molasses C so as to charge all of the powder raw materials.

The viscosity of the molasses C is about 9000 mPa·s at 10° C., about 3000 mPa·s at 20° C., and about 1400 mPa·s at 30° C. As the temperature increases, the viscosity decreases and the fluidity increases. Considering the limit of the pump 5's ability to send the liquid, the temperature of the molasses C is preferably 20° C. or more and more preferably 30° C. or more. However, it is a waste of energy to excessively increase the temperature of the molasses C. Thus, the temperature is preferably 80° C. or less and more preferably 60° C. or less. It is preferable to make an arrangement such that the liquid binder tank 4 and a feed line 11 can be heated with an electrical heater, a steam heater, or the like so that the temperature of the molasses C can be controlled. In order to prevent the molasses C from solidifying inside the pump 5 and the feed line 11 by any remote chance, it is more preferable to provide, for example, a circulation line 12 branching from the middle of the feed line 11 to circulate the molasses C to the liquid binder tank 4, a flow control valve 13 to the circulation line 12, and a shutoff valve 14 at a point on the feed line 11 on the mixer 3-side of the branching point. When the circulation line 12 is provided, the pump 5 is constantly driven at a particular load. When the molasses C is not fed to the mixer 3, the shutoff valve 14 is closed and the flow control valve 13 is opened by a particular degree so that the molasses C can be constantly circulated through the circulation line 12. In supplying the molasses C to the mixer 3, the shutoff valve 14 is opened and the opening of the flow control valve 13 is narrowed so that the rate of feeding the molasses C to the mixer 3 can be adjusted while maintaining the circulation of the molasses C through the circulation line 12.

When the batch mixer 3 is used in such a case, adding of the molasses C may be stopped by closing the shutoff valve 14 once the accumulated amount of the molasses C added to the mixer 3 reaches a certain value. Thus, accurate blending is possible despite changes in rate of feeding the molasses C over time. As with the powder raw materials, the molasses C may be temporarily stored in a scale hopper 2 and weighed; however, countermeasures for preventing solidification of the molasses C inside the scale hopper 2 are needed. If a solid binder is used, the scale hopper 2 may be used as with other powder raw materials.

At the time of charging the molasses C, particular amounts of powder raw materials are already present in the mixer 3 and are in a fluid state due to the effect of stirring as the mixer 3 is driven. Thus, the molasses C continuously fed thereto is sequentially taken into the powder raw materials in a fluid state. As a result, generation of lumps is effectively prevented and the molasses C evenly disperses into the powder raw materials.

After all of the molasses C and the powder raw materials are charged, they are further mixed for a predetermined time so that the molasses C evenly disperses over the entirety of the powder raw materials, thereby giving a homogeneous powder mixture D. In this specification, the mixing operation that takes place after all of the powder raw materials (metal oxide raw material and carbonaceous material) and the molasses C (highly viscous liquid binder) are charged is also referred to as "kneading". The longer the kneading time, the more homogeneous the mixing state (refer to Examples below). The kneading time is preferably 2 minutes or more and more preferably 5 minutes or more. However, if the kneading time is too long, the productivity is degraded. Thus, the kneading time is preferably 30 minutes or less and more preferably 15 minutes or less.

In order for the molasses C to disperse evenly as described above, predetermined amounts of the powder raw materials must be fed before charging of the molasses C starts. It is more effective to have larger amounts of powder raw materials charged before charging of the molasses C is started. However, if charging of the molasses C is started after all of the powder raw materials are charged, the time taken from the start of the charging of the powder materials to the completion of kneading becomes too long that the productivity is degraded. Thus, the amount of the powder raw materials to be charged before inception of the charging of the molasses C may be adequately controlled by comprehensively taking into account the effect of even dispersion and the productivity.

In the case where a solid binder is used, a homogeneous powder mixture D in which the solid binder is evenly dispersed over the entirety of the powder raw materials can still be obtained as with the cases described above.

(Forming Step)

All of the powder mixture D mixed in the mixer 3 is temporarily discharged into a surge hopper 6. The powder mixture D is quantitatively fed from the surge hopper 6 by a screw feeder 7 and compaction-formed into compacts E having a particular shape by a briquetting machine 8.

Here, the volume of the surge hopper 6 is preferably equivalent to one batch of the mixer 3 or more. This is because the powder mixture D can be fed to the briquetting machine 8 without interruption. However, the powder mixture D containing the binder is relatively easy to solidify and thus an excessively large volume relative to the amount required is not preferred. Alternatively, the total of the volume of the surge hopper 6 and the hopper volume of the screw feeder 7 may be equivalent to one batch of the mixer 3 or more.

The compacts E formed by the briquetting machine 8 are classified through a screen 9 having a particular mesh size (e.g., 5 mm) into an oversize F and an undersize G. The oversize F is recovered as product briquettes (carbon composite iron oxide briquettes) and used as the raw material for a rotary hearth furnace not shown in the drawing.

The undersize G as a recycle raw material may be allowed to return to a recycle raw material bin 10 and charged into the mixer 3 together with the powder raw materials (iron ore A and carbonaceous material B) to make efficient use of it.

As described above, because the batch mixer 3 is used instead of a continuous mixer, the amounts of the powder raw materials and the binder can be accurately measured for each batch and the mixing ratio of the binder to the powder raw materials can be adequately maintained with high accuracy. Thus, the briquettes made from the powder mixture are homogeneous, the strength of briquettes is prevented from varying, and a high strength can be stably ensured.

The product briquettes (carbon composite iron oxide briquettes) prepared as described above, i.e., the oversize F, are obtained by compaction-forming the homogeneous powder mixture D in which the molasses C serving as a liquid binder is evenly dispersed over the entirety. Thus, the briquettes formed therefrom are homogeneous and have a small variation in strength. Moreover, the long kneading time further decreases the strength variation and increases the strength. This is because the liquid binder disperses more finely into the powder mixture D by extending the kneading time.

(Modifications)

In the embodiments described above, an example in which the addition of the molasses C is started after at least part of the iron ore A and at least part of the pulverized coal B are charged is described. Alternatively, the addition of the molasses C may be started after only at least part of the iron ore A is charged without charging any of the pulverized coal B or after only at least part of the pulverized coal B is charged without charging any of the iron ore A.

Preferable examples of the solid binder for briquetting include waste paper composed of cellulose fibers, cardboard paper, woodchips, sugarcane waste, and straw. Although molasses is described as an example of the liquid binder in the embodiment described above, lignin, dextrin, and starch may also be used as the liquid binder either alone or in combination of two or more.

In the embodiments described above, iron ore is used as an example of a metal oxide raw material A. Alternatively, steel mill waste such as blast furnace dust, converter dust, electrical furnace dust, and mill scale may be used or mineral ore containing non-ferrous oxides such as nickel oxide, chromium oxide, manganese oxide, or titanium oxide may be used. Two or more types selected from these may be used together depending on the usage.

Although coal (pulverized coal) is described as an example of the carbonaceous material B in the embodiment above, one or more of coke, oil coke, charcoal, woodchips, plastic waste, used tires, and the like may be used.

Although two types of powder raw materials are used in the embodiments described above, three or more powder raw materials may be used, e.g., a metal oxide raw material, a carbonaceous material, a binder, and other auxiliary raw materials (hydrated lime, quick lime, dolomite, etc.) may be used.

EXAMPLES

The present invention will now be specifically described by using Examples, but it should be understood that the examples described below do not limit the scope of the present invention and are subject to adequate modifications without departing from the essence of the descriptions above and below, which are all within the technical scope of the present invention.

A metal oxide raw material (iron ore) and a carbonaceous material (coal) having median particle diameters and chemical compositions shown in Table 1 were used as new raw materials. An undersize (5 mm or less) of briquettes produced by using these new raw materials only was separately recovered as a recycle raw material. Blackstrap molasses serving as a highly viscous liquid binder was added to 77 parts by mass of the iron ore, 23 parts by mass of the coal, and 7 parts by mass of the recycle raw material so that the amount of the blackstrap molasses added was 4.5 parts by mass relative to 100 parts by mass of the new raw materials excluding the recycle raw material (i.e., 77 parts by mass of the iron ore and 23 parts by mass of the coal), the 4.5 parts by mass being the number not included in the 100 parts by mass of the new raw materials. The resulting mixture was mixed by a batch mixer to prepare a blend raw material for briquetting (powder mixture).

TABLE 1

| (a) Carbonaceous material | | |
|---|---|---|
| Items | Unit | Coal |
| Median particle diameter | μm | 45 |
| Proximate analysis | | |
| Volatile matter | Mass % | 17.8 |
| Ash | Mass % | 9.3 |
| Fixed carbon | Mass % | 72.9 |
| Ultimate analysis | | |
| C | Mass % | 83.3 |
| H | Mass % | 4.1 |
| N | Mass % | 1.0 |
| S | Mass % | 0.3 |
| O | Mass % | 1.9 |
| (b) Metal oxide raw material | | |
| Items | Unit | Iron ore |
| Medial particle diameter | μm | 40 to 50 |
| Components | | |
| T. Fe | Mass % | 67.5 |
| S | Mass % | 0.01 |
| $SiO_2$ | Mass % | 1.6 |
| CaO | Mass % | 0.03 |

(NOTE: Median particle diameter is a particle diameter associated with a 50% point in a cumulative curve of a powder having a particle size distribution that assumes the total volume to be 100%, and was measured by Microtrac (laser diffraction-scattering method).)

A mix muller mixer (processing volume: 1500 L/batch) constituted by a cylindrical main body having an inner diameter of 2540 mm and a height of 2100 mm, a wheel called "muller", a plow, and a scraper was used as the batch mixer.

Experimental Example 1

The schedule of charging the iron ore, pulverized coal, recycle raw material, and blackstrap molasses into the batch mixer was as shown in Table 2 below. The iron ore, pulverized coal, and recycle raw material were weighed in advance with scale hoppers so that the amounts thereof corresponded to the total amounts to be charged for one batch, fed onto a table feeder at predetermined rates, and charged into the batch mixer. As shown in Table 2 below, the schedule was arranged such that charging of the iron ore completed in 3 minutes, the pulverized coal in 5 minutes, and the recycle raw material in 1 minute. The blackstrap molasses was fed at a particular feed rate by a metering pump (diaphragm pump) while the tank and feed piping were preliminarily heated to 40° C. to 50° C. with electrical heaters. Upon completion of charging of the iron ore (3 minutes after inception of charging of the iron ore, pulverized coal, and recycle raw material), a shutoff valve was opened and the opening of a flow control valve of a circulation line was narrowed to start feeding the blackstrap molasses. Even after feeding of the blackstrap molasses was completed (8 minutes after inception of the charging of the iron ore etc.), the batch mixer was continuously driven for a predetermined time (5 minutes in the example shown in Table 2) to conduct kneading, and all of the resulting powder mixture was discharged from the batch mixer into a surge hopper.

TABLE 2

| Time (min) | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Raw | Iron ore | ▓ | ▓ | ▓ | | | | | | | | | | | |
| material | Pulverized coal | ▓ | ▓ | ▓ | ▓ | ▓ | | | | | | | | | |
| feeding | Recycle raw material | ▓ | | | | | | | | | | | | | |
| | Blackstrap molasses | | | | ▓ | ▓ | ▓ | ▓ | ▓ | | | | | | |
| Mixing | | ▓ | ▓ | ▓ | ▓ | ▓ | ▓ | ▓ | ▓ | ▓ | ▓ | ▓ | ▓ | ▓ | |
| Discharging | | | | | | | | | | | | | | | ▓ |

(NOTE: The shaded parts indicate that the corresponding operation is being implemented.)

Each of the iron ore and the coal described above was dried in a drier until the water content was less than 0.1 mass % before charged into the batch mixer. Since the blackstrap molasses contained water, the water content in the produced briquettes varied in the range of about 1 to 2 mass % on a dry basis.

The powder mixture described above was quantitatively fed by a screw feeder from the surge hopper and formed into briquettes each having a volume of about 10 cm by a briquetting machine equipped with a rotating roll having a roll diameter of 520 mm, a roll width of 200 mm, and a pocket size of 30 mm (length)×25 mm (width)×7 mm (depth).

A drop test below was conducted to investigate the strength of the briquettes.

The drop test involves dropping the briquettes from a height of 45 cm onto an iron plate and determining whether the briquettes break or not. If the briquettes remain unbroken, dropping is repeated until they break. The average number of times taken for ten briquettes to break was assumed to be the drop strength of the briquettes. The results are shown in Table 3.

Experimental Example 2

Briquettes were prepared as in EXPERIMENTAL EXAMPLE 1 except that the kneading time in the batch mixer was changed to 1 minute, and the drop strength was measured. The results are shown in Table 3.

Experimental Example 3

Briquettes were prepared as in EXPERIMENTAL EXAMPLE 1 except that the kneading time in the batch mixer was changed to 2 minutes, and the drop strength was measured. The results are shown in Table 3.

TABLE 3

| Kneading time (min) | 1 | 2 | 5 |
|---|---|---|---|
| Drop strength (number of times) | 1 | 8 | 12 |

Table 3 shows that although the drop strength of the briquettes increases with the length of kneading time in the batch mixer, there is a tendency that the drop strength becomes saturated after a kneading time of 2 minutes.

Comparative Example

Briquettes were prepared as in EXPERIMENTAL EXAMPLE 1 except that the charging of the blackstrap molasses was started at the same time with charging of the powder raw materials, and the drop strength was measured. Some showed a high drop strength of 10 or more but some showed a low drop strength of 1. The variation in the strength of the briquettes was significantly larger than in EXPERIMENTAL EXAMPLES 1 to 3.

As has been described in detail above, an aspect of the present invention provides a method for producing carbon composite metal oxide briquettes, the method including a mixing step of adding a binder to a metal oxide raw material and a carbonaceous material and mixing the binder, the metal oxide raw material, and the carbonaceous material by a mixer to prepare a powder mixture, and a forming step of press-forming the powder mixture into carbon composite metal oxide briquettes by using a briquetting machine, in which a batch mixer is used the mixer used in the mixing step.

According to this method, because a batch mixer is used as the mixer instead of a continuous mixer, the amounts of the powder raw materials (metal oxide raw material and carbonaceous material) and the binder can be accurately measured for each batch and the mixing ratio of the binder to the powder raw materials can be maintained at an adequate ratio with high accuracy. Since the liquid binder is homogeneously dispersed in the powder mixture, briquettes made from the powder mixture become homogeneous and the variation in the strength of the briquettes can be suppressed.

In this method, scale hoppers are preferably used in feeding the metal oxide raw material and the carbonaceous material from storage bins into the mixer. The metal oxide raw material and the carbonaceous material in amounts slightly larger than the amounts required for one batch may be respectively placed in the scale hoppers and an arrangement may be made to stop feeding once the total amount of feed reaches the amount required for one batch. In this manner, even when the feed rate changes during feeding, the amount to be fed into the mixer during the one batch remains unaffected and precise amounts of materials can be fed.

In this method, a surge hopper having a volume equivalent to one batch of the mixer or more is preferably provided between the mixer and the briquetting machine. When the volume of the surge hopper is equivalent to one batch of the mixer or more, the powder mixture can be fed to the briquetting machine without interruption.

In this method, charging of the binder into the mixer (addition of the binder) is preferably started after at least part of the metal oxide raw material and/or at least part of the carbonaceous material is charged into the mixer. Because charging of a binder into the mixer is started after at least part of the metal oxide raw material and/or at least part of the carbonaceous material is charged into the batch mixer, the binder is efficiently mixed into the powder raw materials already charged and uneven distribution of the binder which causes lumps and the like can be prevented. Since the binder is evenly dispersed in the powder mixture, briquettes made from the powder mixture become homogeneous and the variation in the strength of the briquettes is suppressed.

In the mixing step of this method, the length of time of mixing by the mixer after entire amounts of the metal oxide raw material, the carbonaceous material, and a binder are charged into the mixer is preferably 2 to 30 minutes. When the kneading time is 2 to 30 minutes, high-strength briquettes can be efficiently produced.

In this method, the binder is preferably a highly viscous liquid binder. The viscosity of the highly viscous liquid binder can be adjusted by changing the temperature and the availability of the highly viscous liquid binder is high. Thus, briquettes having a stable strength can be produced efficiently.

In this method, the highly viscous liquid binder is preferably at least one selected from the group consisting of molasses, lignin, dextrin, and starch. The molasses, lignin, dextrin, and starch are easily available and the viscosity thereof can be controlled by changing the temperature. Thus, briquettes having a stable strength can be produced efficiently.

In this method, the metal oxide raw material is preferably an iron oxide-containing substance. When an iron oxide-containing substance such as iron ore is used as the metal oxide raw material, carbon composite iron oxide briquettes suitable for producing reduced iron can be produced.

INDUSTRIAL APPLICABILITY

According to a method for producing carbon composite metal oxide briquettes of the present invention, carbon composite metal oxide briquettes having a stable strength can be produced.

The invention claimed is:

1. A method for producing carbon composite metal oxide briquettes, comprising:
   adding a binder to a metal oxide raw material and a carbonaceous material and mixing the metal oxide raw material, the carbonaceous material, and the binder by a mixer to prepare a powder mixture; and
   press-forming the powder mixture into carbon composite metal oxide briquettes in the presence of a briquetting machine,
   wherein, in said adding is performed in the presence of a batch mixer, and
   wherein a surge hopper having a volume equivalent to one batch of the mixer or more is provided between the mixer and the briquetting machine.

2. The method for producing carbon composite metal oxide briquettes according to claim 1, wherein the metal oxide raw material and the carbonaceous material are transferred in the presence of scale hoppers into the mixer from storage bins.

3. The method for producing carbon composite metal oxide briquettes according to claim 1, wherein charging of the binder is started after at least part of the metal oxide raw material or at least part of the carbonaceous material, or both, is charged.

4. The method for producing carbon composite metal oxide briquettes according to claim 1, wherein, in said adding, a length of time of mixing by the mixer after entire amounts of the metal oxide raw material, the carbonaceous material, and the binder are charged into the mixer, is 2 to 30 minutes.

5. The method for producing carbon composite metal oxide briquettes according to claim 1, wherein the binder is a highly viscous liquid binder.

6. The method for producing carbon composite metal oxide briquettes according to claim 5, wherein the highly viscous liquid binder is at least one selected from the group consisting of molasses, lignin, dextrin, and starch.

7. The method for producing carbon composite metal oxide briquettes according to claim 1, wherein the metal oxide raw material comprises iron oxide.

8. A method for producing carbon composite metal oxide briquettes, comprising:
   adding a binder to a metal oxide raw material and a carbonaceous material and mixing the metal oxide raw material, the carbonaceous material, and the binder by a mixer to prepare a powder mixture; and
   press-forming the powder mixture into carbon composite metal oxide briquettes in the presence of a briquetting machine,
   wherein, in said adding is performed in the presence of a batch mixer, and
   wherein charging of the binder is started after at least part of the metal oxide raw material or at least part of the carbonaceous material, or both, is charged.

9. The method for producing carbon composite metal oxide briquettes according to claim 8, wherein the metal oxide raw material and the carbonaceous material are transferred in the presence of scale hoppers into the mixer from storage bins.

10. The method for producing carbon composite metal oxide briquettes according to claim 8, wherein, in said adding, a length of time of mixing by the mixer after entire amounts of the metal oxide raw material, the carbonaceous material, and the binder are charged into the mixer, is 2 to 30 minutes.

11. The method for producing carbon composite metal oxide briquettes according to claim 8, wherein the binder is a highly viscous liquid binder.

12. The method for producing carbon composite metal oxide briquettes according to claim 11, wherein the highly viscous liquid binder is at least one selected from the group consisting of molasses, lignin, dextrin, and starch.

13. The method for producing carbon composite metal oxide briquettes according to claim 8, wherein the metal oxide raw material comprises iron oxide.

* * * * *